United States Patent [19]

Young

[11] Patent Number: 4,936,629
[45] Date of Patent: Jun. 26, 1990

[54] SWIVELING INFANT CAR SEAT

[75] Inventor: Quentin Young, San Antonio, Tex.

[73] Assignee: Rock-A-Bye Restraint Company, Inc., San Antonio, Tex.

[21] Appl. No.: 406,982

[22] Filed: Sep. 13, 1989

Related U.S. Application Data

[63] Continuation-in-part of Ser. No. 254,716, Oct. 7, 1988.

[51] Int. Cl.$^5$ .............................................. A47D 1/10
[52] U.S. Cl. ..................................... 297/250; 297/349
[58] Field of Search ................ 297/250, 254, 349, 364, 297/130, 134

[56] References Cited

U.S. PATENT DOCUMENTS

4,762,364   8/1988   Young .................................. 297/250

*Primary Examiner*—Peter R. Brown
*Attorney, Agent, or Firm*—Cox & Smith Incorporated

[57] ABSTRACT

A swiveling infant car seat with an infant restraint device comprises a pedestal formed with a circular opening bordered by a lip to which a base is connected for distribution loads therebetween. A substantially circular base for a seat is formed with a groove around the periphery of an annulus which receives the inner periphery of the anchor plate therein to the seat to the pedestal. The base includes a pivot plate, an anchor plate, and a retainer plate for holding the pivot plate in swiveling relationship with the anchor plate. The seat is reclinably attached to the base for orientation at select inclinations, and a latch mounted on the pedestal is engageable with the base to selectively hold the seat in either a forward facing or a rearward facing orientation. A rearward member is also mounted to the rear of the pedestal and a pair of diametrically opposite, grooved receptacles are provided on the base for receiving a tongue of the rearward member to maintain the integrity of the seat in the event the automobile in which the seat is mounted is involved in a collision.

3 Claims, 8 Drawing Sheets

SWIVELING INFANT CAR SEAT

CROSS-REFERENCE TO RELATED APPLICATION

This is a continuation-in-part of Applicant's co-pending U.S. Patent Application, Ser. No. 254,716, which was filed on Oct. 7, 1988, entitled SAFETY SWIVEL CHAIR, and Applicant claims the benefit of that co-pending application. The entire disclosure of that application, including its accompanying drawings, is included herein by this reference thereto just as though that disclosure was set forth herein in its entirety.

FIELD OF THE INVENTION

The present invention relates to infant car seats and, more particularly, it relates to a reclinable and rotatable infant car seat which is adapted to mount atop a standard automobile seat equipped with a seat belt in a sturdy manner for preserving the safety of an infant seated therein during a collision.

BACKGROUND OF THE INVENTION

Safe restraint of infants during automobile transport is of utmost importance, principally because they are relatively defenseless to injury in the event of a collision. Complete restraint in such event would be ideal; but the nature of mounting an infant car seat atop a primary automobile seat, as is standard, presents an added degree of movement which compounds the problem of infant safety in an infant car seat. Consequently, great efforts are made in the design of infant car seats to secure the infant as fixedly as possible. A rearward-facing, unitary construction of an infant car seat is generally considered ideal for satisfying safety requirements.

On the other hand, the safe restraint of an infant must be balanced with convenience and comfort both for the infant and for individuals resPonsible for the infant. The field of infant car seats is therefore presented with several other obstacles not encountered with restraint devices that are intended for adult use only. Not only must an infant car seat protect its occupant from the impact forces caused during a collision, but it is also desirable that the seat be easily oriented to enable placement and removal of an infant. It is also desirable that the seat be easily removable from the car when not in use and that the seat be capable of facing either forwardly or rearwardly. For adult passengers, convenience and comfort are enabled with adjustable seats, such as by equipping the seat to recline and/or swivel relative to its base.

Consequently, even though the idea of equipping an infant car seat to accomplish such movements seems to contravene the object of maximum restraint, infant car seats which provide some degree of movement have been proposed in the past. For instance, U.S. Pat. No. 4,205,877 to Ettridge for an invention entitled "Children's Reclining Car Seats" discloses a seat which can be moved between a slumbering position and a sitting position. Further, though not specifically intended for automobile use, U.S. Pat. No. 1,577,807 to Orwick discloses a chair which can be swiveled on its pedestal. Still further, U.S. Pat. No. 4,762,346 to Young, which is assigned to the same assignee as the present invention, discloses and claims an infant restraint device for use in a moving vehicle which can be both reclined and swiveled.

However, due to the added safety problems accompanying the presence of movable seats and moving parts thereof, each of the previous proposals have never reached the market. It is an object of the present invention to overcome the difficulties and the obstacles encountered by the prior art.

Additionally, as effective as the above-cited devices may be for their particular intended purposes, the present invention recognizes there is still, and indeed always will be, room for improving such devices by either strengthening the devices for greater safety or by making them easier to handle and use. Such are objectives of the present invention. Furthermore, the present invention recognizes that these objectives are not mutually exclusive.

More particularly, it is an object of the present invention to provide a safety car seat for infants which is sufficiently rugged to withstand impact forces and restrain the occupant from movement which might otherwise cause death or injury. Another object of the present invention is to provide an infant car seat which distributes forces over larger surface areas to help optimize the seat's structural integrity.

Still another object of the present invention is to provide a safety car seat for infants which can be moved and reconfigured for the comfort of the infant or for facilitating placement of the infant into the seat or removal of the infant from the seat. The present invention is further directed to providing a pivotable infant car seat, the parts of which are configured to cooperate in a manner which does not compromise the structural integrity of the seat.

Yet another object of the present invention is to provide a safety car seat for infants which is relatively light, easy to operate, relatively easy to manufacture and which is cost effective for its intended purposes. Many other objects will be obvious to those skilled in the art in light of the foregoing and following and in view of the prior art.

SUMMARY OF THE INVENTION

Three primary embodiments of the infant car seat of the present invention are disclosed. A first embodiment comprises a pedestal that is formed with a substantially circular opening through a platform of the pedestal which is approximately horizontal when the seat is properly installed.

In the first embodiment of the present invention, the seat is rotatably mounted to a pedestal by means of a disk-shaped base having a grove around its peripheral edge which is slidingly engaged with a lip of the pedestal which is located along the peripheries of a substantially circular opening through a platform of the pedestal. The base comprises a pivot plate and an anchor plate which are held together and positioned on opposite sides of the opening. In this configuration each plate has portions overhanging the lip of the pedestal to create the groove in which the lip is received.

More specifically, the pivot plate has a projection which is slidingly supported on the lip of the pedestal when the pivot plate is positioned to cover the opening. Similarly, the anchor plate has an extension which overhangs the lip. Means, such as sets of bolts and cooperating nuts, are provided to hold the pivot plate to the anchor plate and thereby to create the grove between the projection and the extension in which the lip of the pedestal is received. With this combination the base is able to swivel on the pedestal. The seat of the first embodiment of the present invention is attached to the pivot plate of the base and allowed to swivel therewith on the pedestal. Further, the interaction between the pedestal's lip and both the pivot plate s peripheral protrusion and the anchor plate's peripheral extension provides a substantial area over which impact forces can be distributed to thereby help maintain the structural integrity of the safety seat.

In another aspect, of an infant safety seat as described above, a bearing means is provided between the lip of the pedestal and the projection of the pivot plate for supporting the pivot plate and for enabling easy swiveling of the pivot plate relative to the pedestal. In the embodiment disclosed herein, such a bearing means includes a track formed into the lower surface of the projection of the pivot plate. A circular hat rests on the lip encircling the opening in the pedestal which is formed with a circular bearing race substantially congruent with but opposed to the track on the pivot plate when the hat and pivot plate are assembled on the pedestal. A plurality of ball bearings, preferably housed in a bearing retainer, rests in this bearing race and supports the pivot plate at the track therein.

Where the hat is fabricated of a magnetic material, the formation of a window through the hat at a point on the circumference thereof can be used to provide a warning when the seat itself has swiveled out of its preferred forwardly oriented position. A magnetic material detector coupled to appropriate electronic circuitry is located on the pivot plate at the level of the hat in a position that is opposite the window when the safety seat is in this preferred orientation. When the pivot plate and the seat attached thereto are in other than this preferred position, the magnetic material of the hat to either side of the window causes the magnetic detector and the electronic circuitry associated therewith to generate a warning signal. The provision of additional windows in the hat can enable the chair to be oriented in additional corresponding positions, such as a rearwardly facing position, without generating such a signal.

In the first embodiment, the seat further comprises a channel mount which is fixedly attached to the pivot plate. The first embodiment of the present invention also comprises a guide rail which is fixedly attached to the seat and slidingly engaged with the channel mount to allow movement of the seat relative to the pedestal between an upright or sitting position and a reclining position.

The swivel action and the reclining action of the seat on the pedestal are controlled by respective latch assemblies. In particular, the latch assembly for controlling the swivel action of the first embodiment of the present invention includes a lever arm which is pivotally mounted on the pedestal for movement between a first and a second position. When not activated, the lever arm is urged into the first position. Diametrically opposed notches are formed on the anchor plate which are independently engageable with the lever arm when the arm is in the first position. When the arm is moved to the second position, the pivot plate and attached chair seat are freed to swivel on the base. When the arm is free to be urged into the first position, the arm is engageable with one of the notches on the anchor plate to hold the chair seat on the pedestal in either a forward or a rearward orientation.

The latch assembly for controlling the reclining action of the chair also comprises a pivotally mounted latch arm. This arm, however, is mounted on the channel mount of the chair seat and is urged into a first position wherein it is engageable with indentations on the channel mount to hold the guide rail in a fixed relationship with the channel mount and, consequently, hold the chair seat in a fixed relationship with the pivot plate of the base. In accordance with this structure, the swivel action and reclining action of the chair seat can be independently controlled.

A second embodiment also comprises a pedestal that is formed with a substantially circular opening through a platform of the pedestal which is approximately horizontal when the seat is properly installed. The second embodiment also comprises a seat for an infant, a pedestal for mounting the seat on a bench of an automobile, and means for rotatably mounting the seat to the pedestal to enable swiveling of the seat.

In contrast to the base of the first embodiment, though, the base of the second embodiment includes a fixed anchor plate and a pivot plate which pivots relative to the anchor plate. The anchor plate is secured to the underside of the pedestal around its peripheral edge to distribute forces which may be encountered in a collision. The seat, itself, is reclinably mounted to the pivot plate. The load between the seat and its pivot plate is distributed by an arcuate slide mount which enables the reclinable mounting of the seat. The pivot plate is rotatably connected to the anchor plate by means of a mounting bolt and a circular load distribution plate which are connected to the slide mount support in a manner which sandwiches the pivot plate between the slide mount support and the upper surface of the pedestal.

The retainer plate is mounted to said pivot plate to form a circular groove therebetween for receiving an inner rim of said anchor plate in a manner which enables rotation of said pivot plate relative to said anchor plate. The anchor plate also has a peripheral extension formed integral therewith for distributing loads between said anchor plate and the lip of said pedestal, said extension having a diameter larger than the diameter of said opening.

A rearward anchoring plate is rigidly secured to the rear pedestal for slideably engaging one of two arcuate lip members mounted on the pivot plate. Through such engagement, the rearward anchoring plate opposes the moment created between the seat and the pedestal in the event of rapid deceleration of the automobile, such as would occur in most collisions of the vehicle. Similarly, loads are distributed about the periphery of the opening by the pivot plate while distributing opposite loads on the bottom surface of the anchor plate. The anchoring member comprises a downwardlY protruding tongue which mates with a receptacle which defines a groove mounted to the pivot plate. The groove is positioned to slidably receive said tongue when the seat is pivoted into a select position.

In a third embodiment of the present invention, the slidable recline assemblies of the first and second embodiments are removed. Instead, a plurality of support arms are rotatably attached respectively to the base and to the chair seat to swing the seat between an upright position and a reclining position. A lock mechanism is mounted on the base to hold the seat in either of these positions.

Many other objects, features and advantages of this invention, as well as the invention itself, both as to its structure and its operation, will be best understood by those skilled in the art from the accompanying drawings, taken in conjunction with the accompanying description, in which similar reference characters refer to similar parts, and in which:

DESCRIPTION OF THE PREFERRED EMBODIMENT

Figure 1:
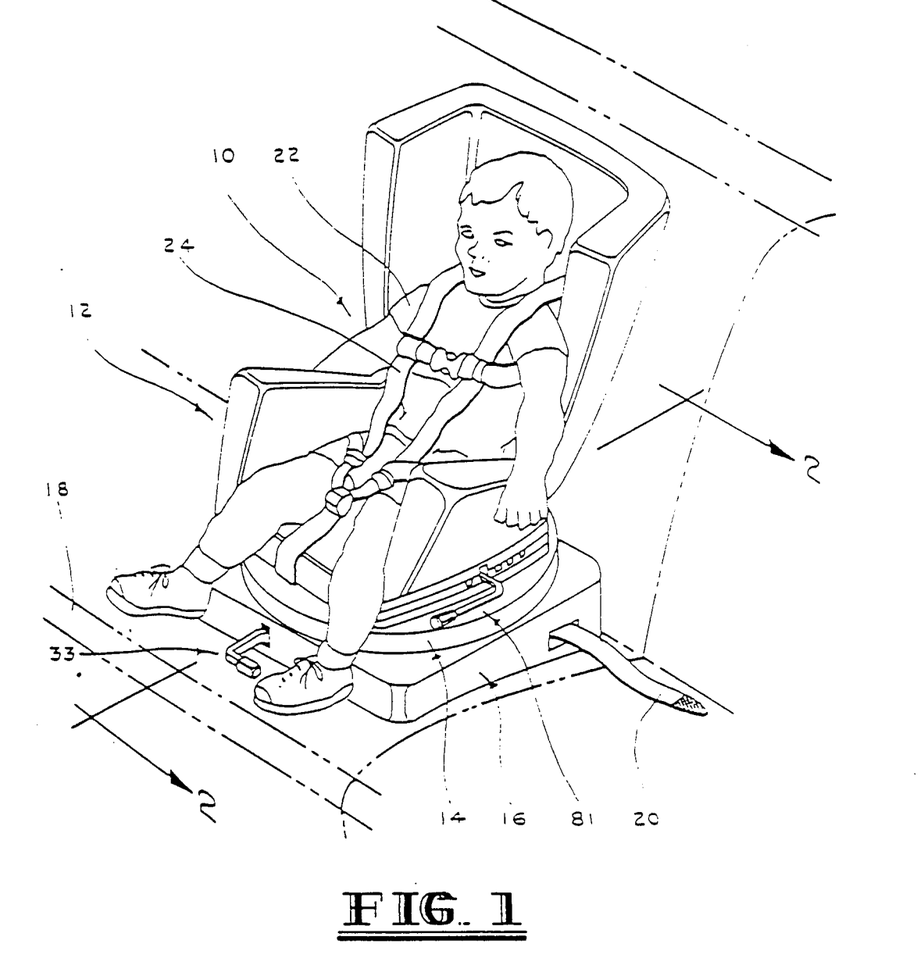
FIG. 1 is a perspective view of the first embodiment of the present invention with an infant sitting in the seat thereof.

Referring initially to FIG. 1, a first embodiment of the swiveling infant car seat for holding an infant during vehicular transport is shown and generally designated 10. As can be seen in FIG. 1, safety seat 10 generally comprises a seat 12 which is mounted on a base 14 that is pivotally attached to a pedestal 16. This combination is shown positioned on a car bench 18 to which it can be securely held by a device such as a lap belt 20.

Although an infant 22 is shown in FIG. 1 being held into seat 12 by a five-point restraint harness 24, it is to be understood that any restraint device well known in the art will suffice for this purpose. For example, a car seat restraint system as manufactured and sold by the Strolee company under the mark SNUG-LOC is suitable for the purposes of this invention. A rotation latch assembly 33 mounted in the forward portion of pedestal 16 and a seat inclination latch assembly 81, which may be mounted on either or both sides of first embodiment of the present invention 10, control the orientation of seat 12.

Figure 2:
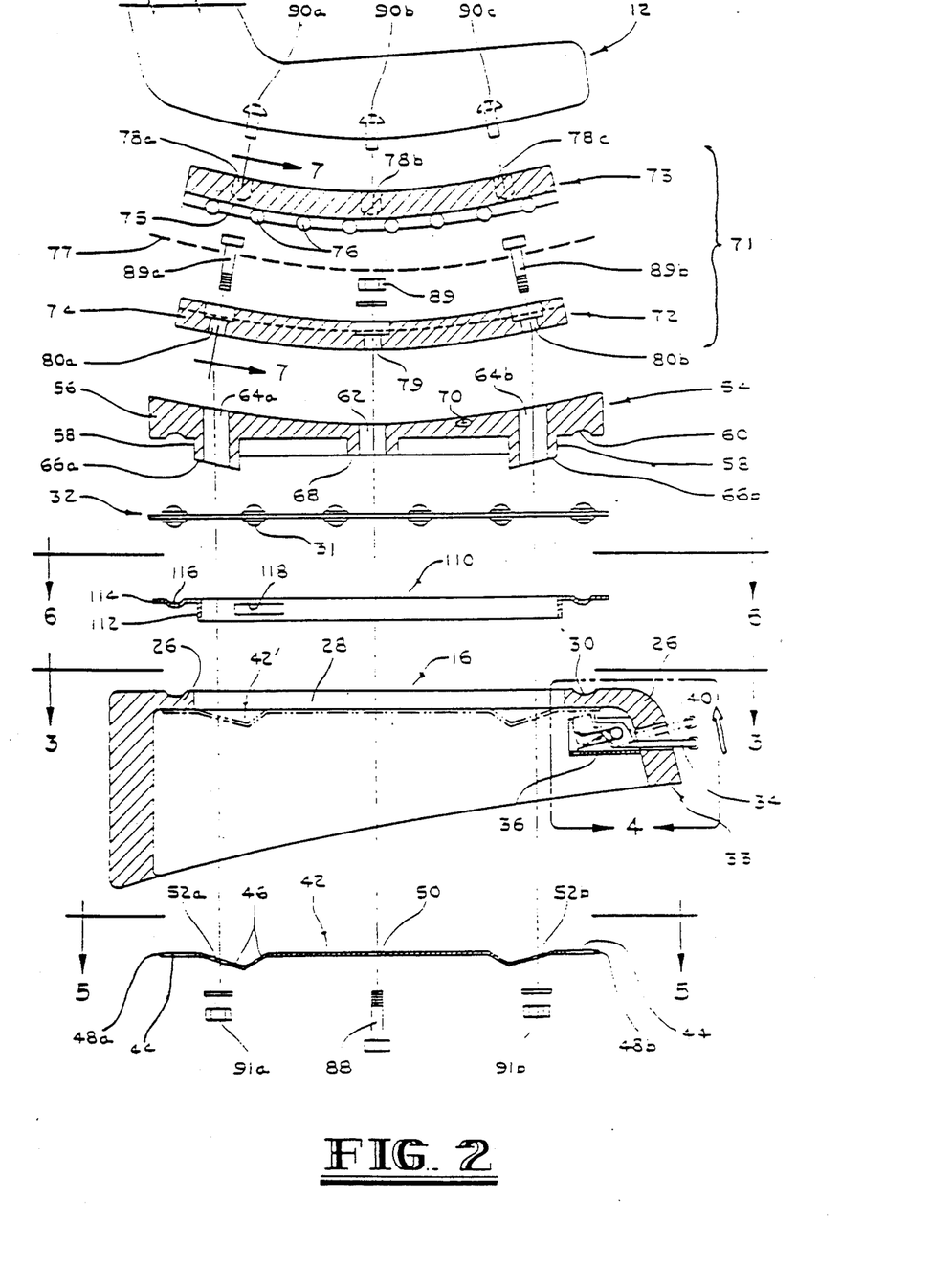
FIG. 2 is an exploded cross-sectional view of the first embodiment of the present invention as seen along the line 2—2 in FIG. 1 with the infant removed.
Figure 3:
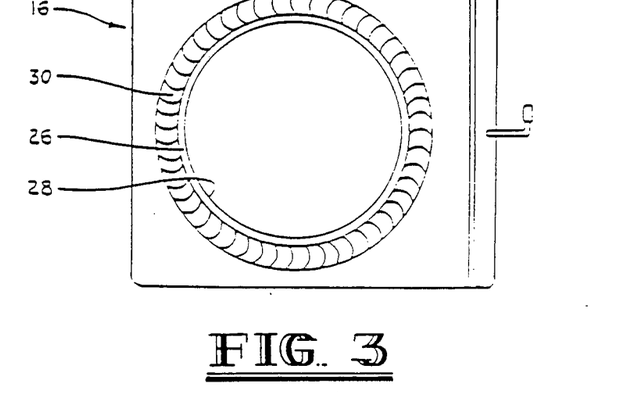
FIG. 3 is a top plan view of the pedestal of the first embodiment of the present invention as seen along the line 3—3 in FIG. 2.

Referring now to FIG. 2, it can be seen that pedestal 16 is formed with a lip 26 which borders a substantially circular opening 28. As best seen by cross-referencing FIG. 2 and FIG. 3, lip 26 is formed with a circular channel 30 in which a plurality of ball bearings 31 may be positioned directly in any manner well known in the pertinent art to facilitate swiveling of seat 12 on pedestal 16. Alternatively, as will be disclosed subsequently, it is preferable to interpose additional structure on lip 26 between channel 30 and ball bearings 31 to further enhance such swiveling.

FIG. 2 also shows a latch assembly 33 which is operatively mounted on pedestal 16. As seen in greater detail in FIG. 4, latch assembly 33 comprises a lever arm 34 which is mounted onto pedestal 16 for pivotal movement above a pivot pin 35. Pivot pin 35 and lever arm 34 are mounted to pedestal 16 by a mounting bracket 36 secured to the inside of pedestal 16 by screws. A spring 38 wrapped about pivot pin 35 urges lever arm 34 into a first Position shown by solid lines in FIG. 4. The movement of lever arm 34 in the direction indicated by arrow 40 into a second position shown by phantom lines thus requires the application of force by an operator at the remove end of lever arm 34 in the direction of arrow 40. The actual purpose of this manipulation will be discussed subsequently.

Figure 5:
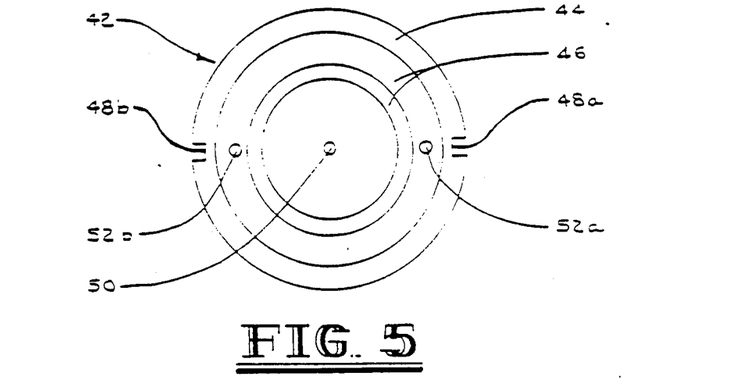
FIG. 5 is a top plan view of the pivot plate of the first embodiment of the present invention as seen along the line 5—5 in FIG. 2.

FIG. 2 also shows the first embodiment of the present invention 10 comprises an anchor plate 42. By cross-referencing FIG. 2 and FIG. 5, it will be seen that anchor plate 42 is substantially circular in shape and is formed with a peripheral extension 44 which generally defines the edge of plate 42. As shown, anchor plate 42 is formed with an inclined indent 46 which is set in from peripheral extension 44. Notches 48a and 48b are cut into the peripheral extension 44 on diametrically opposite sides of a center hole 50 and engagement holes 52a and 52b are formed into inclined indent 46 of anchor plate 42. Like notches 48a and 48b, engagement holes 52a and 52b are also on opposite sides of center hole 50. As shown, the engagement holes 52a and 52b are formed into the outer inclined portion of indent 46 for reasons to be subsequently disclosed. It is to be appreciated that notches 48a and 48b are so aligned in order to allow seat 12 to be positioned in either a forward-facing or a rearward-facing position. The locking mechanism to establish these specific orientations will be subsequently disclosed. Further, it will be appreciated that notches 48a and 48b are only exemplary. Additional notches can also be provided as desired.

As shown in FIG. 2, a pivot plate 54 is provided with a peripheral projection 56. Peripheral projection 56 establishes one side of a groove 58 that is more completely defined when pivot plate 54 is joined to anchor plate 42, as is also shown in part in FIG. 4. Specifically, when pivot plate 54 and anchor plate 42 are joined, groove 58 is created between the peripheral projection 56 of pivot plate 54 and the peripheral extension 44 of anchor plate 42. It is also to be understood that when pivot plate 54 and anchor plate 42 are joined together, the resulting structure is disk-shaped base 14 shown in FIG. 1.

In accordance with one aspect of the present invention, bearing means are provided between lip 26 and projection 56 for supporting pivot plate 54 and for enabling easy swiveling of pivot plate 54 relative to pedestal 16. As shown by way of example and not limitation, in FIG. 2 a track 60 is formed on the lower surface of projection 56 within groove 58. Track 60 is substantially congruent with and opposed to channel 30 on the upper surface of lip 26 when pivot plate 54 covers opening 28.

In one embodiment of the present invention, a plurality of ball bearings 31 housed with a bearing retainer 32 are operably mounted between lip 26 of pedestal 16 and projection 56 of pivot plate 54 for pivotably supporting projection 56 on pedestal 16. More preferably, FIGS. 2 and 6 taken together depict a circular hat 110 which is to be positioned on lip 26 within opening 28. In this regard, hat 110 includes an annular ring portion 112 which depends into opening 28 and a radially outwardly extending flange portion 114 for resting on lip 26 in a mating relationship with channel 30, best seen in FIG. 4.

Figure 6:
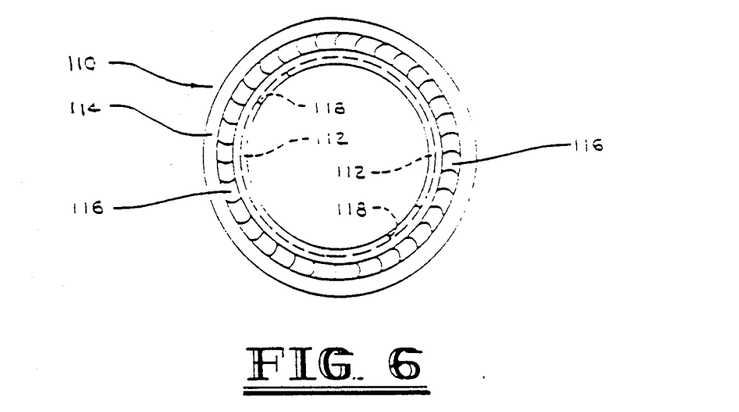
FIG. 6 is a top plan view of the hat of the first embodiment of the present invention as seen along the line 6—6 in FIG. 2.

In the upper surface of flange portion 114 is formed a circular bearing race 116 substantially congruent with a track 60 when hat 110 is positioned on lip 26 and pivot plate 54 is positioned to cover opening 29. When hat 110 is employed, the plurality of ball bearings 31 ride in bearing race 116 while supporting pivot plate 54 at track 60 formed therein. It is to be appreciated that with ball bearings 31 operatively positioned in bearing race 116, or even in channel 30, pivot plate 54 rests upon pedestal 16 and, by engaging ball bearings 31 with track 60, is capable of relatively resistance-free rotation for swiveling relative thereto.

Optionally, where hat 110 is fabricated of a magnetic material, it is possible, through the use of an appropriate magnetic material detector located on pivot plate 54, to generate a warning signal whenever seat 12 is in other than the preferred forward-facing or rearward-facing positions thereof. Toward this end, for each preferred position of seat 12, a window 118 is formed through annular portion 112 of hat 110. Correspondingly, a magnetic material detector (now shown for purposes of clarity) is located on pivot plate 54 in groove 58 at such a position thereon as to oppose window 118 when seat 12 is in one of its preferred positions. With this arrangement, pivoting of seat 12 out of such a preferred position will result in the detection of the magnetic material forming flange portion 114 of hat 110 to either side of window 118. Through the use of electronic or other means known in the art and couples to the magnetic detector, a warning signal can accordingly be generated by which to warn adult occupants of the vehicle in which first embodiment of the present invention 10 is being employed.

FIG. 2 also shows that pivot plate 54 is formed with a center hole 62 and a pair of engagement holes 64a and 64b which are diametrically opposed to one another across center hole 62. Additionally, pivot plate 54 is formed with spacers 66a and 66b which respectively surround engagement holes 64a and 64b and a center spacer 68 which surrounds center hole 62. Further, pivot Plate 54 is formed with a curved surface 70 which is on the side of pivot plate 54 opposite spacers 66a, 66b and 68.

Figure 7:
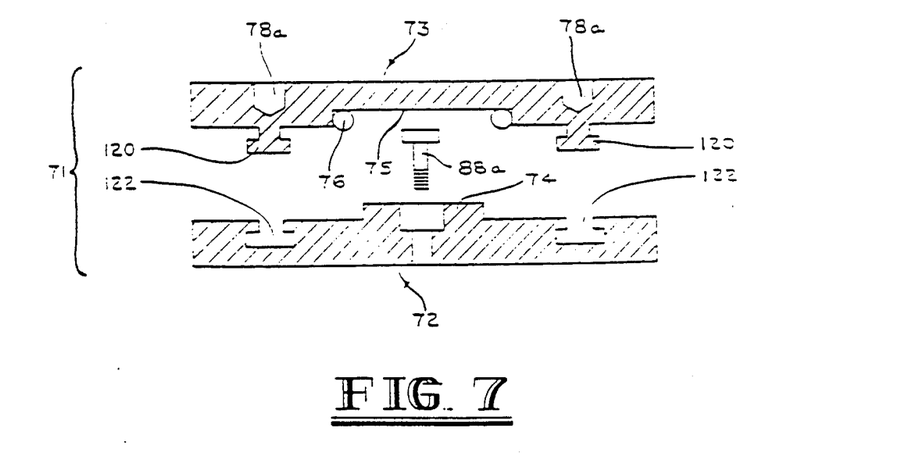
FIG. 7 is a sectional elevation view of the recline assembly of the first embodiment of the present invention as seen along the line 7—7 in FIG. 2.

FIGS. 2 and 7 taken together show a recline assembly 71 which comprises a channel mount 72 and a guide rail 73 slidingly supported thereon. Channel mount 72 and guide rail 73 are longitudinally slideably coupled to each other by known means, such as by elongated cooperating tongues 120 and grooves 122 oriented in the direction of the sliding desired. An upstanding elongated projection 74 on the top surface of channel mount 72 is received in a correspondingly shaped recess 75. Both projection 74 and recess 75 are oriented in a front-to-back direction in relation to seat 12. A plurality of ball bearings 76 are operatively positioned between guide rail 73 and channel mount 72 within recess 75 on either side of projection 74 to permit forward and backward sliding of guide rail 73 upon channel mount 72. This results in relative pivoting movement between channel mount 72 and guide rail 73 along a radial interface 77 therebetween.

For the purpose of securing seat 12 to guide rail 73, a series of tapped bore holes 78a, 78b and 78c are formed on either side of the top surface of guide rail 73. These tapped bore holes receive respectively threaded screws 90a, 90b, and 90c which pass through seat 12 as shown in FIG. 2. While guide rail 73 is secured for sliding motion upon channel mount 72 by tongues 120 in grooves 122, prior to the interlocking of guide rail 73 and channel mount 72, channel mount 72 is secured to anchor plate 42 so as to clamp therebetween pedestal 16, flange portion 114 of hat 110, bearing retainer 32, and projection 56 of pivot plate 54. Toward this end, center bore hole 79 and bore holes 80a and 80b on opposite sides thereof are formed through channel mount 72.

Figure 8:
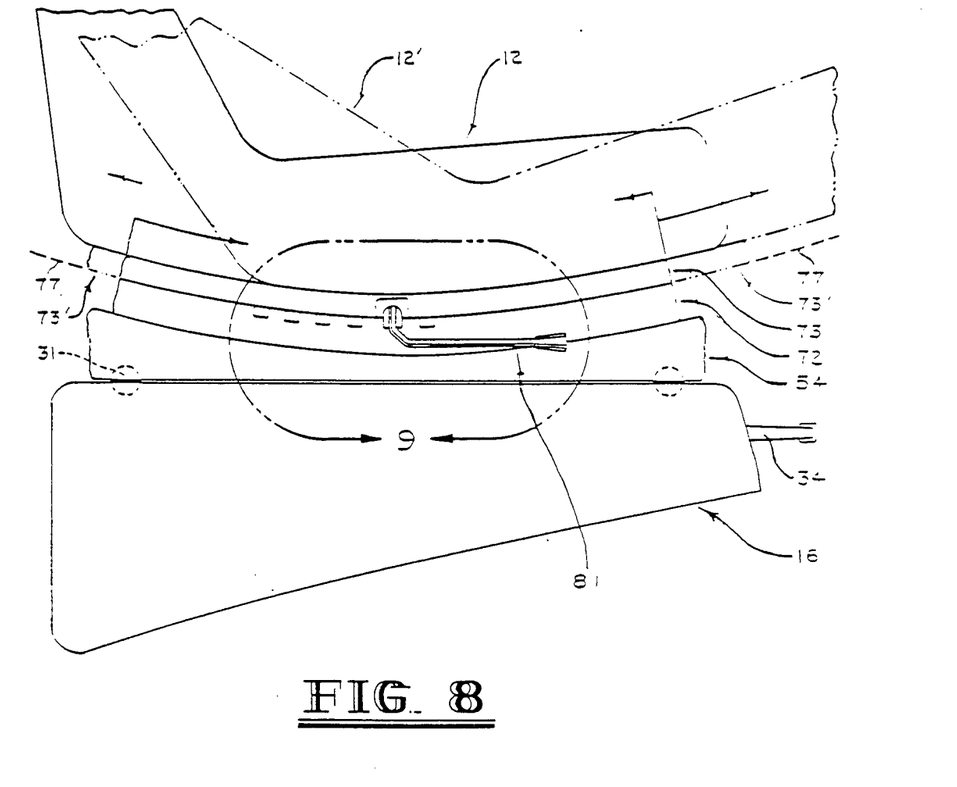
FIG. 8 is a right side view of the first embodiment of the present invention with a portion of the seat shown in an upright position and this same portion of the seat shown in phantom in a reclining position.
Figure 9:
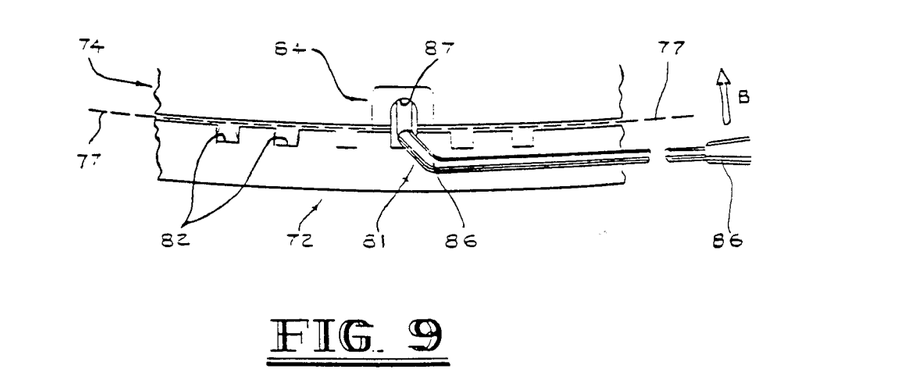
FIG. 9 is a detail elevation view of the inclination latch assembly for controlling reclining of the first embodiment of the present invention seen in FIG. 8.

Referring now to FIGS. 8 and 9 together, the operation of a seat inclination latch assembly 81 for controlling the sliding of guide rail 73 on channel mount 72 will be described. Channel mount 72 is positioned on guide rail 73 and slideably attached thereto in a manner already disclosed. A plurality of indentations 82 are formed onto channel mount 72. Seat inclination latch assembly 81 is selectively releasable and used to prevent relative sliding of guide rail 72 upon channel mount 72 along radial interface 77. This fixes seat 12 at any desired one of the inclinations dictated by latch assembly 81.

Latch assembly 81 includes a pivot mount 84 which is fixedly attached to guide rail 73. A latch arm 86 is pivotally connected to pivot mount 84 and urged by a spring thereof (not shown) downwardly as viewed in FIG. 8 into an engage position. In this position, a portion of latch arm 86 is inserted into one of indentations 82 to hold guide rail 73 in a fixed relationship with channel mount 72. Manipulation of latch arm 86 upward in the direction indicated by arrow B against the urging of the spring moves latch arm 86 out of engagement with any of indentations 82 into a recess 87 in pivot mount 84. This allows guide rail 73 to slide along channel mount 72 to reconfigure the inclination of first embodiment of the present invention 10.

The overall assembly of first embodiment of the present invention 10 is best appreciated by reference to FIG. 2. Initially, hat 110 is placed in an opening 28 in pedestal 16. Pivot plate 54 is positioned with ball bearings 31 between bearing race 116 on the upper side of hat 110 and track 60 on the lower side of projection 56 of pivot plate 54. Then the base 14 is constructed by joining anchor plate 42 to pivot plate 54 while lip of pedestal 16 is positioned therebetween. This places anchor plate 42 in the position shown in phantom for anchor plate 42'. In this manner, anchor plate 42' is positioned over the opening 28 with peripheral extension 44 resting on the underneath side of lip 26. Once joined, pivot plate 54 and anchor plate 42 establish a disk-shaped base 14 which defines the peripheral groove 58 between projection 56 and extension 44. When pivot plate 54 and anchor plate 42 are joined, center spacer 68, which surrounds center hole 62, rests against anchor plate 42 in a position where it is also concentric with and abuts the periphery of center hole 50. In a similar manner, spacers 66a and 66b are positioned against the inclined detent 46 of anchor plate 42 in a manner which causes spacers 66a and 66b to respectively surround engagement holes 52a and 52b.

Channel mount 72 is then positioned against curved surface 70 of pivot plate 54. With anchor plate 42, pedestal 16, pivot plate 54 and channel mount 72 aligned, substantially as disclosed above, center bolt 88 is inserted sequentially through center hole 50 in anchor plate 42, center hole 62 in pivot plate 54, and center bore hole 79 for engagement and tightening against a center nut 91. A center bolt 88 is inserted through bore hole 80a in channel mount 72, engagement hole 64a in pivot plate 54, and engagement hole 52a in anchor plate 42 for engagement and tightening with a nut 91a. Bolt 89a is inserted through bore hole 80a and engagement holes 64a and 52a for engagement with a nut 91a. Likewise, bolt 89b is inserted through bore hole 80b and engagement holes 64b and 52b for engagement with a nut 91b. It is to be appreciated that, with this connection, center bolt 88, and bolts 89a and 89b connect channel mount 72 with base 14 in a manner which establishes a pivotal engagement of channel mount 72 with the pedestal 16.

In accordance with the combination of structure described above, seat 12 is thus reclinable relative to the pedestal 16 by virtue of the interaction of guide rail 73 with channel mount 72. Also, seat 12 is pivotally moveable with respect to pedestal 16 by virtue of the interaction of the base 14 with respect to pedestal 16. Control of these movements is accomplished by appropriate latch assemblies.

Figure 4:
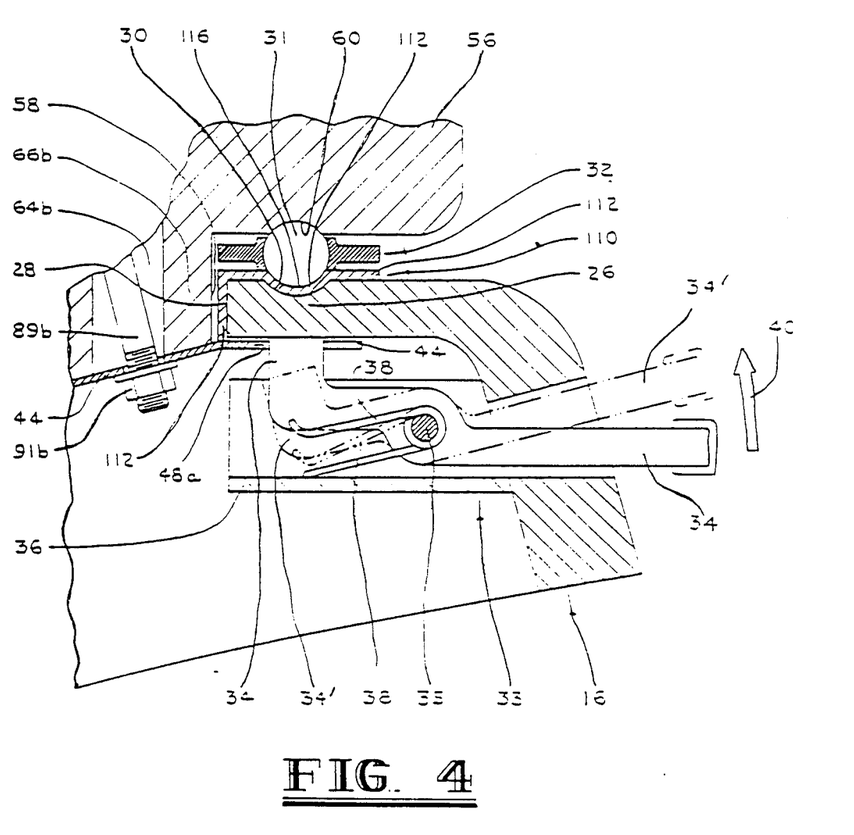
FIG. 4 is a detail elevational section of the rotation latch assembly for controlling swiveling of the first embodiment of the present invention seen in FIG. 2.

Specifically, as seen in FIG. 4, rotation latch assembly 33 comprises lever arm 34 which is engageable with notches 48a and 48b of anchor plate 42 to hold anchor plate 42 in a fixed relationship with respect to pedestal 16. Consequently, by virtue of the connection between anchor plate 42, pivot plate 54 and seat 12, lever arm 34 is also able to fixedly hold seat 12 in predetermined rotational or swivel orientation with respect to pedestal 16. As shown for the present invention, notches 48a and 48b allow seat 12 to be oriented in either a forward-facing position with respect to pedestal 16 or in a rearward-facing position with respect to pedestal 16. Window 118 in hat 110 may be employed with suitable electronic circuitry to generate a warning signal when this is not the case.

The reclining action of seat 12 is controlled by seat inclination latch assembly 81 shown to advantage in FIG. 9. There the interaction of latch arm 86 with indentations 82 on channel mount 72 arrests movement of guide rail 73 along radial interface 77. More specifically, as shown in FIG. 8, when seat 12 is in an upright position, latch arm 86 is engaged with an individual one of indentations 82. It will be apparent to the skilled artisan, however, that manipulation of latch arm 86 to disengage arm 86 from indentation 82 will allow a sliding movement of guide rail 73 along channel mount 72 which reorients seat 12 into a reclined position 12' shown in phantom. This also moves guide rail 73 into a phantom position shown as 73'. Latch arm 86 is engageable with another of indentations 82 on channel mount 72 for the purpose of holding the seat in reclined position 12'.

Figure 10:
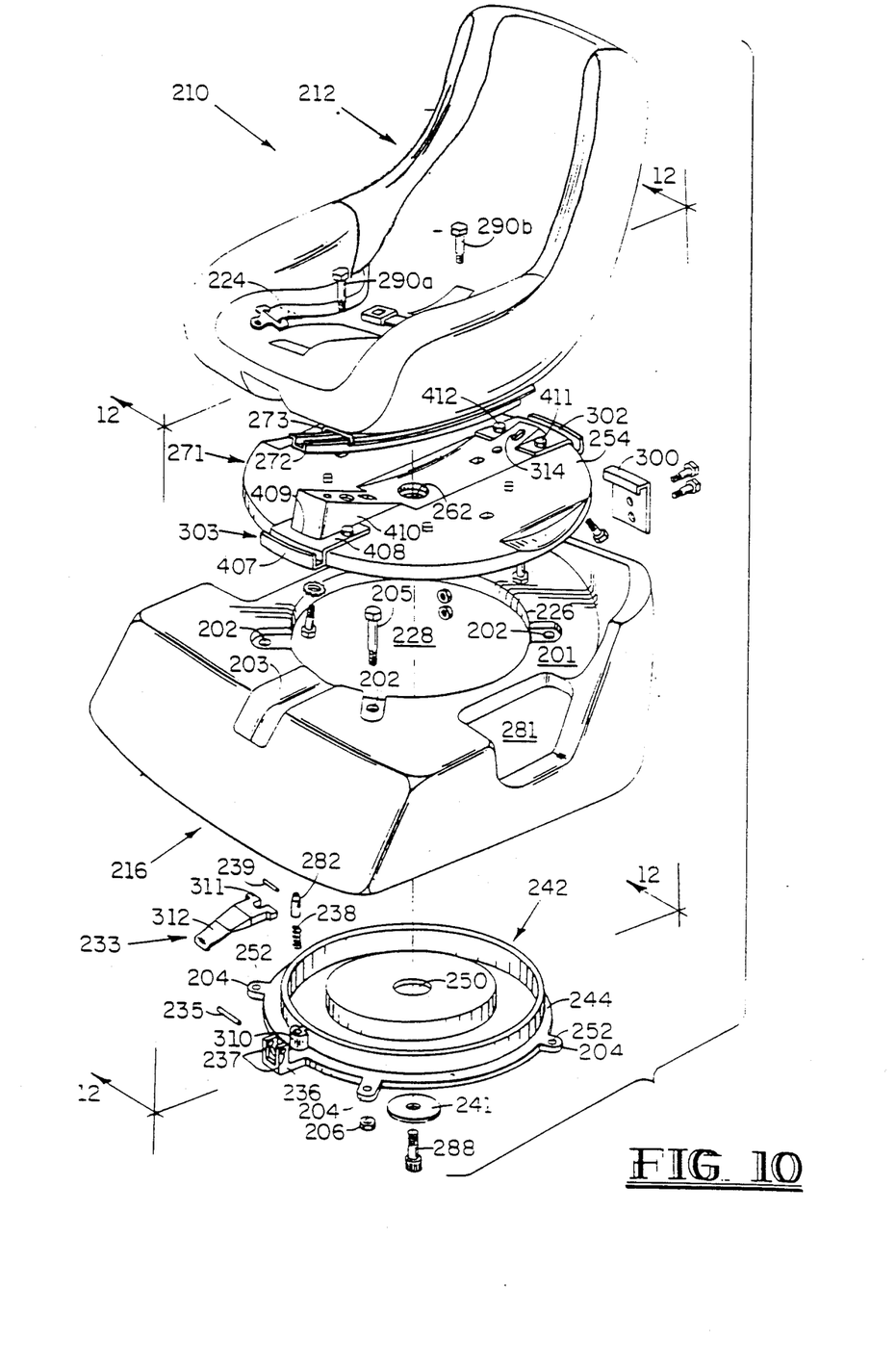
FIG. 10 shows an exploded perspective view of a second embodiment of the infant car seat of the present invention.
Figure 11:
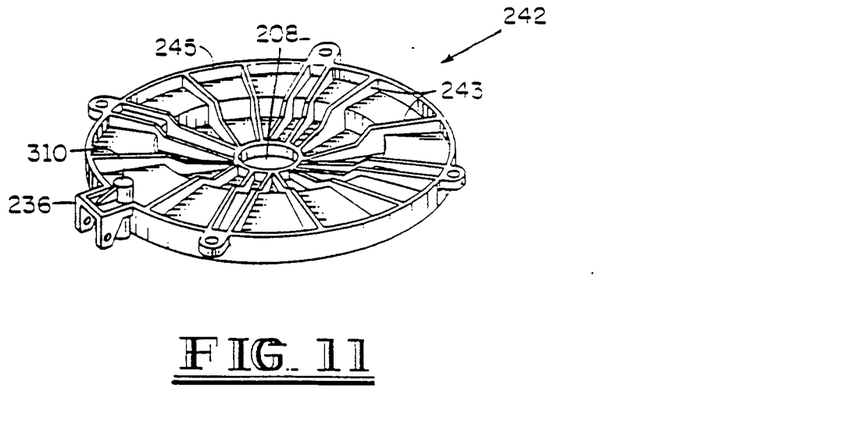
FIG. 11 shows an inverted, worm's-eye perspective view of the reinforced anchor plate of the embodiment shown in FIG. 10.
Figure 12:
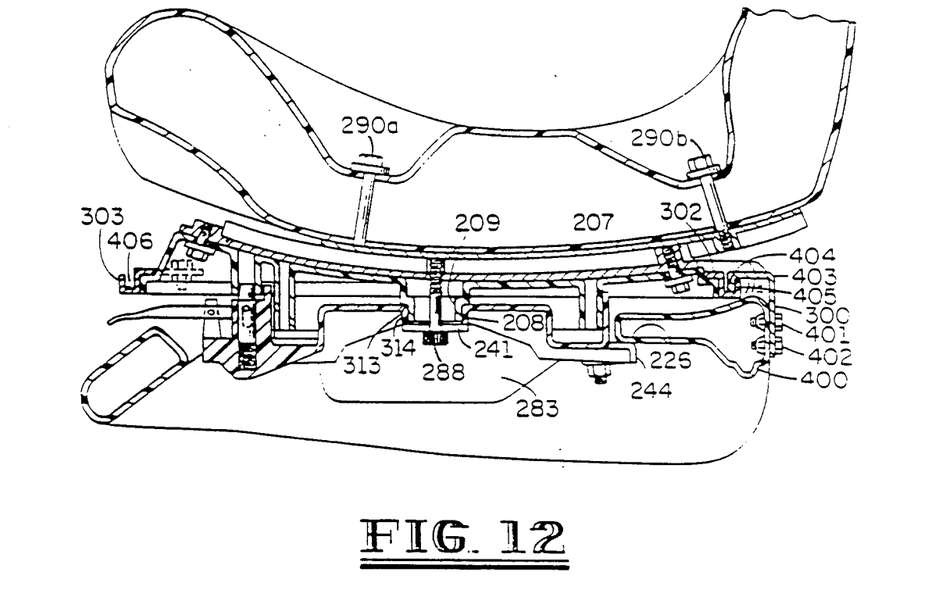
FIG. 12 shows a central cross-sectional view of the second embodiment as seen along sectional plane 12—12 of FIG. 10, with the second embodiment being fully assembled.

A second embodiment of the present invention is shown in FIGS. 10–12 and generally designated 210. Components of the second embodiment 210 which are similar, or at least analogous, to components of the first embodiment have similar reference numerals except that 200 has been added to the reference numerals to designate parts of infant car seat 210; for instance, seat 212 of the second embodiment is similar to seat 12 of the first embodiment and base 214 is analogous to base 14 of the first embodiment. As will be obvious to those of ordinary skill in the art, components of the first and second embodiments can generally be interchanged to produce many other combinations which are not specifically shown in the drawings but which are within the scope of the present invention. Similarly, components shown in one embodiment but not another may be employed for similar purposes on the other embodiment. This is not to say, though, that certain components of either embodiment which are not similarly numbered cannot be interchanged or are not analogous.

The infant car seat 210 generally comprises a seat 212 which is reclinably mounted on a base 214. Base 214, in turn, is mounted to a pedestal 216 for swivelably (i.e., rotatably) connecting seat 212 to pedestal 216. Although pedestal 216 is more stylized than pedestal 16 of the first embodiment, the combination of infant car seat 210 may be secured to a car bench with a standard seat belt positioned through lateral openings 281, 283 of pedestal 216 in the same manner that the first embodiment 10 (shown in FIG. 1) can be secured to a car bench 18.

As can best be seen by cross-referencing FIG. 10 and FIG. 12, pedestal 216 is formed with a lip 226 which circumferentially borders a substantially circular opening 228. The upper surface 201 of lip 216 provides a substantially planar surface above which a pivot plate 254 of base 214 rotates. Surface 201 is positioned substantially horizontally when pedestal 216 is properly mounted on a car bench such as car bench 18 (shown in FIG. 1). Countersunk holes 202 are provided through lip 226 with countersinks on upper surface 201. A slot-like opening 203 is provided in the forwardmost portion of lip 226 for enabling extension and movement of the distal end 234 of a latch assembly 233 therethrough and therein, respectively.

In contrast to anchor plate 42, anchor plate 242 is fixed relative to lip 226. Anchor plate 242 is substantially circular in shape and is formed with a peripheral extension 244 which engages the lower surface of lip 226 to distribute loads about the circumference of opening 228. A plurality of tabs 204, with holes 252 therethrough, are also formed integrally with anchor plate 242 in spaced relationship around the circumference thereof. A plurality of bolts 205 (only one of which is shown) secure anchor plate 242 to pedestal 216 with mating nuts 206 threadably engaged with bolts 205.

An outer annulus 207 is concentric with and extends upwardly from anchor plate 242 adjacent the perifery of opening 228, and an inner annulus 208 is formed at the inner circumference of anchor plate 242. Inner annulus 208 and outer annulus 207 are formed integral with anchor plate 242 for maintaining the integrity of the combination of infant car seat 210 and for distributing the load between pivot plate 254 and anchor plate 242 and between anchor plate 242 and pedestal 216, respectively. A third annulus, annulus 217, is formed integrally with pivot plate 254 for similar purposes. Annulus 217 protrudes downwardly from pivot plate 254 and is slightly smaller in diameter than annulus 207 to telescopically and rotatably engage annulus 207.

Thus, when shear stresses are encountered in operation between pivot plate 254 and pedestal 216 (that is, stresses caused by rapid acceleration or decelleration of an automobile in which seat 210 is employed), such stresses are, in large part transferred from pivot plate 254 to anchor plate 242 through the interface between annulus 217 and annulus 207.

Annulus 207, in turn, is slightly smaller in diameter than opening 228 and has a fit in opening 228 which is sufficiently snug to bear against the inner periphery of lip 226 for distributing shear loads thereon. A journal 209 also serves to transfer loads between pivot plate 254 and anchor plate 242. Journal 209, formed integrally with and protruding downwardly from the center of pivot plate 254, is rotatably received within a central hole 250 of anchor plate 242. The inner surface of annulus 208 defines central hole 250. As will be described subsequently herein, a retainer plate 241 connects pivot plate 254 to anchor plate 242 in a manner such that a circular groove is formed between retainer plate 241 and a shoulder 313 of journal 209 within which annulus 208 is rotatably engaged.

Seat 212 is reclinably mounted to base 214 by means of a recline assembly 271 which functions in substantially the same manner as the slide assembly 71 of the first embodiment (shown in FIG. 2). Recline assembly 271 basically comprises a first member 272 and a second member 273 slidingly engaged with one another. Seat 212 is secured to the second member 273 of slide assembly 271 by threaded screws 290a and 290b which are threadably engaged with tapped boreholes 278a and 278b formed in the second member 273 of recline assembly 271. First member 272 and second member 273 are longitudinally slideably coupled to each other by known means, such as by elongated cooperating tongues 120 and grooves 122 disclosed with reference to FIGS. 2 and 7. The exact means for such engagement will be dictated by stress considerations in a particular design. Adjustment of the inclination of seat 212 relative to base 214 is enabled by a selectively releasable latch assembly (not shown) which is virtually identical to that disclosed with reference to FIGS. 8 and 9. By means of such latch assembly, the inclination of seat 212 can be fixed at any desired one of several inclinations.

Pivot plate 254 is also provided with an elongate support formation 410 having a concave upper surface 270 upon which the first member 272 of recline assembly 271 is borne. First member 272 is mounted to pivot plate 254 by means of screws 289 (only one of which is numbered) which are threadably engaged with tapped engagement holes 291. Support formation 410 is oriented to span the upper surface of pivot plate 254 between opposite ends thereof which lie along the sagital plane of seat 212.

The reclinable and pivotable combination of infant car seat 210 is best appreciated with reference to the exploded view of FIG. 10. Once anchor plate 242 has been secured to the underside of pedestal 216 along with latch assembly 233 (described further herein), the first member 272 of recline assembly 271 is positioned against the concave surface 270 of pivot plate 254 and is secured to pivot plate 254 in the manner previously described. Then, pivot plate 254 is rotatably connected to anchor plate 242 by means of a central bolt 288 and a retainer plate 241. Central bolt 288 is inserted sequentially through a central hole of retainer plate 241, the central hole 250 of anchor plate 242 and a central hole 262 of pivot plate 254 and into engagement with the tapped engagement hole of first member 272. Threads of bolt 288 are threadably engaged with a tapped engagement hole of through the lower surface of the first member 272 of recline assembly 271. When retainer plate 241 is secured in operative place by bolt 288, a radially outwardly faced groove 314 is formed between a shoulder 313 of journal 209 and the peripheral edge of the upper surface of retainer plate 241. The inner annulus 208 of anchor plate 242 is rotatably engaged between pivot plate 254 and retainer plate 241 in groove 314 such that pivot plate 254 is rotatable relative to anchor plate 242. Retainer plate 241 is rotatable relative to anchor plate 242 and is held in place relative to bolt 288 by the head of bolt 288. Thus pivot plate 254 is rotatably mounted to pedestal 216.

With such an assembly, the employment of metallic materials is limited so that the overall weight of infant car seat 210 is minimized. Retainer plate 241 and first member 271 are composed of relatively strong metallic materials while pivot plate 254 and anchor plate 242 are composed of relatively light weight materials. Referring to FIG. 11, though, anchor plate 242 is also provided with reinforcing ribs which are radially disposed between central annulus 208 and an outer lip 245 of anchor plate 242 for enhancing the strength and durability of anchor plate 242 despite its relatively light weight composition.

After first member 272 and pivot plate 254 are rotatably mounted to pedestal 246, the upper member 273 of recline assembly 271 is operably engaged with the first member 272 thereof and seat 212 is mounted to the upper member 273 by means of bolts 290a and 290b (as previously discussed). Thus, seat 212 is reclinably and rotatably mounted to pedestal 216.

For additional reinforcement in order to oppose the moment created between seat 212 and pedestal 216 during rapid deceleration of forward movement, particularly when an infant is seated in seat 212, a rearward anchoring member 300 is mounted to the rear of pedestal 216 for engaging pivot plate 254 at either one of two receptacles 302 and 303 mounted on pivot plate 254. As shown in FIG. 12, rearward anchoring member 300 is mounted to a rear wall 400 of pedestal 216 by means of bolts 401 and 402. The upper portion 403 of member 300 is provided with a downwardly protruding tongue 404. Tongue 404 is spaced forwardly from the rear wall 400 of pedestal 216 for engagement with grooves 405 and 406 formed in receptacles 302 and 303, respectively. Tongue 404 is curved in an arc concentric with bolt 288. Similarly, grooves 405 and 406 are curved in an arc about central bolt 288. Receptacle 303 is identical to receptacle 302 and, as is evident in FIG. 10, each of receptacles 302 and 303 comprise a trough-like portion 407 intrgrally formed with a mounting portion 408. The trough-like portions 407 of receptacles 302 and 303, respectively, define grooves 405 and 406 for receiving the tongue 404 of member 300. The mounting portions 408 of receptacles 302 and 303 are each provided with a central notch 409 to enable mounting of receptacles of 302 and 303 in a manner which straddles one of the opposite longitudinal ends of the support formation 410 of pivot plate 254. Receptacle 302 is mounted on the upper surface 413 of pivot plate 254 by means of bolts 411 and 412 through holes in the mounting portion 408 of receptacle 302. Receptacle 303 is similarly mounted to pivot plate 254 at a location diametrically opposite the location of receptacle 302 relative to pivot plate 254.

When properly mounted, receptacles 302 and 303 position grooves 405 and 406, respectively, outside the outer circumference of pivot plate 254. The tongue 404 of member 300 is received in the groove 405 of receptacle 302 when seat 212 is in its forward facing position, and the tongue 404 of member 300 engages the groove 406 of receptacle 303 when seat 212 is positioned in its rearward facing position. Further, upon swiveling of seat 212 from either of those positions, the tongue 404 of member 300 slides out of engagement with the engaged one of grooves 405 and 406. Hence, because seat 212 is positioned in either the forward facing position or the rearward facing position for use during transport of an infant therein, the reception of tongue 404 in receptacles 302 and 303 serves to maintain the structural intregity of infant car seat 210 in the event of a collision.

Referring to FIGS. 10 and 12, a rotation latch assembly 233 is mounted in a mounting bracket 236 which is formed integrally with anchor plate 242 at the forward end thereof. The rotation latch assembly 233 basically comprises a latch post 282, a helical spring 238 and a lever 234 along with pivot pins 235 and trunnion 239. When anchor plate 242 is integrated with pedestal 216, lever 234 is positioned to extend through opening 203 in pedestal 216. Lever 234 is pivotally connected to bracket 236 by means of pivot pin 235 which is secured through holes 237 and mounting bracket 236. The latch post 282 and helical spring 238 are received within a socket central to tubular member 310 in a manner such that helical spring 238 biases latch post 282 upwardly. Trunnion 239 is inserted through a hole in latch post 282 and is secured at its opposite ends to the operative end 311 of lever 234. Tubular member 310 is formed integral with anchor plate 242 with its central axis perpendicular to surface 201.

Through upward pivoting of the forwardly extending end 312 of lever 234, latch post 282 is retracted within the socket of tubular member 310. Then, when the end 312 of lever 234 is released, helical spring 238 biases latch post 232 upwardly to engage one of holes 313 and 314 to fix the rotation of pivot plate 254 in one of two positions—either a forward facing position (such as shown in FIGS. 10 and 12) or a rearward facing position (not shown). The forward facing position and the rearward facing position are suitable for use when infant car seat 210 is occupied by an infant which is being transported. With latch post 282 disengaged by the upward movement of the end 312 of lever 234, seat 212 is freely rotatable relative to pedestal 216 to enable positioning and removal of an infant therein. The disengagement of latch post 282 also enables the orientation of seat 212 to be changed from either of the forward facing position or the rearward facing position to the other.

Means such as the magnetic material detector discussed above may be employed with infant car seat 210 to provide a warning signal to warn adult occupants in the event latch post 282 is inadvertently left disengaged.

Figure 13:
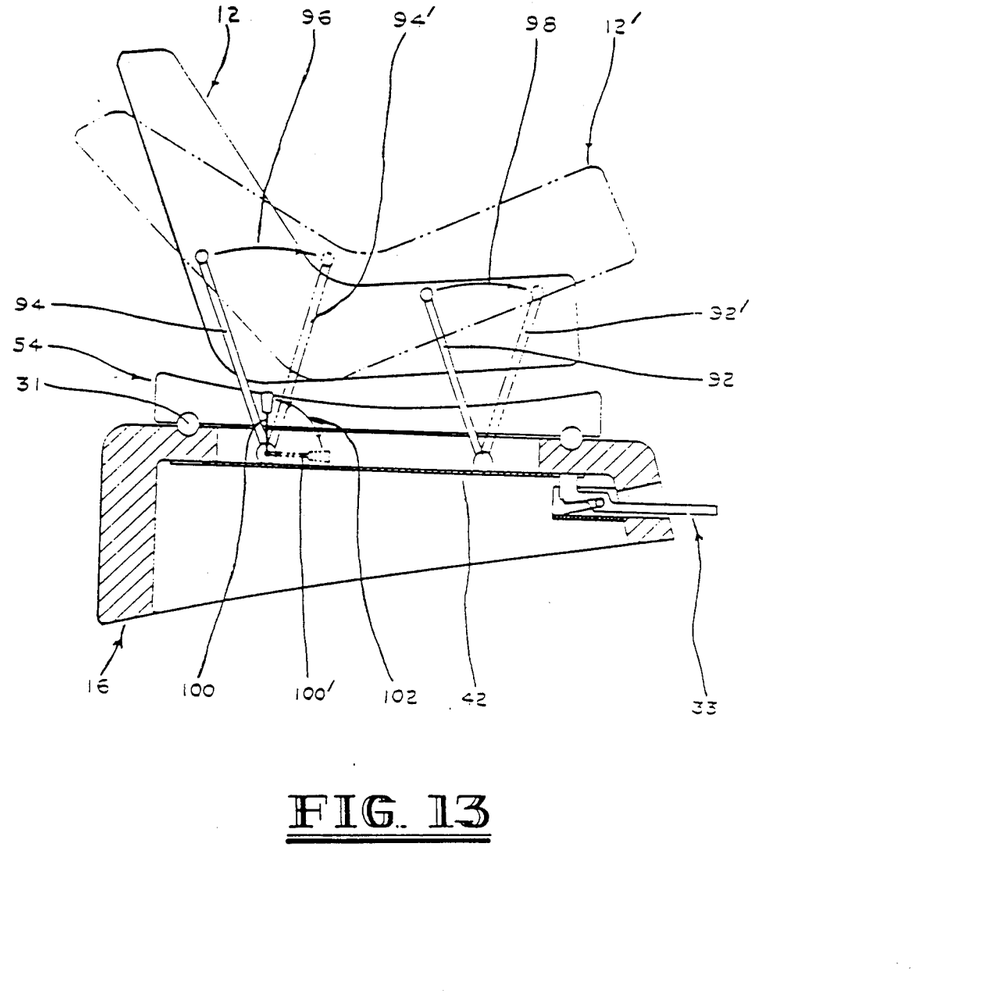
FIG. 13 is a side view of a third embodiment of the present invention with portions broken away for clarity and showing the seat in an upright position and showing the seat in phantom in a reclining position.

In a third embodiment of the present invention, as shown in FIG. 13, the reclining assembly comprising channel mount 72 and guide rail 73 is eliminated. Instead, as shown in FIG. 10, seat 12 is connected to anchor plate 42 by a plurality of swingable support arms. A forward support arm 92 is pivotally attached to both seat 12 and anchor plate 42. Likewise, an aft support arm 94 is pivotally attached to seat 12 and to anchor plate 42. As intended by the present invention, rotation of forward support arm 92 and aft support arm 94 in the directions generally indicated by arrows 96 and 98, respectively, will swing seat 12 into a reclined position substantially as shown in phantom for seat 12'.

A locking lever 100 is provided to fixedly hold support arm 94 in either its position 94 or 94'. Manipulation of locking lever 100 to the position 100' in the direction as indicated by arrow 102 allows movement of the support arm 94. Consequently, aft support arm 94 can be moved to the position shown in phantom for aft support arm 94' and forward support arm 92 can be moved simultaneously into the phantom position shown for forward support arm 92'. Once seat 12 has been so moved, locking lever 100 can be moved back to the lock position as shown, and seat 12' will be stationarily held with respect to anchor plate 42. Subsequent movement of set a 12 between the sitting position and the reclining position can be easily accomplished merely by the manipulation of locking lever 100. In all other important respects, the alternate embodiment of the present invention is similar to that previously disclosed for the first embodiment.

While the particular swiveling infant car seat as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. An infant car seat adapted to mount on the seat of an automobile for supporting an infant thereon during movement of the automobile, comprising:
   a seat for an infant;
   a pedestal for mounting said seat on a bench of an automobile, said pedestal being formed with an opening bordered by a substantially circular lip;
   a base for rotatably mounting said seat to the lip of said pedestal to enable swiveling of said seat relative to said pedestal; and
   a member for maintaining the integrity of the infant car seat in the event of a collision, said member comprises a downwardly protruding tongue, said base has a receptacle mounted thereto which defines a groove positioned to slidably receive said tongue when said seat is pivoted into a select position, said member being mounted to a rearward portion of said pedestal to engage a rearwardly positioned extremity of said base.

2. The infant car seat of claim 1, wherein:
   said base comprises an anchor plate and a pivot plate, said pivot plate being rotatably mounted to said anchor plate;
   a retainer plate is mounted to said pivot plate to form a circular groove therebetween for receiving an inner rim of said anchor plate in a manner which enables rotation of said pivot plate relative to said anchor plate; and
   said anchor plate has a peripheral extension formed integral therewith for distributing loads between said anchor plate and the lip of said pedestal, said extension having a diameter larger than the diameter of said opening.

3. The infant car seat of claim 2, wherein:
   said pivot plate comprises an annulus formed concentrically therewith for engaging a second annulus formed concentric with said anchor plate.

* * * * *